United States Patent [19]

Hollaway, Jr.

[11] 4,127,039

[45] Nov. 28, 1978

[54] ENDLESS POWER TRANSMISSION BELT

[75] Inventor: Gerald C. Hollaway, Jr., Springfield, Mo.

[73] Assignee: Dayco Corporation, Dayton, Ohio

[21] Appl. No.: 764,497

[22] Filed: Jan. 31, 1977

[51] Int. Cl.² .............................................. F16G 1/26
[52] U.S. Cl. ..................................... 74/232; 152/359;
156/110 A; 156/123 R; 156/137; 156/308;
156/327; 156/335; 260/839; 428/36; 428/287;
428/295; 428/302; 428/303; 428/395; 428/474
[58] Field of Search ................. 260/839, 38, 841, 852,
260/851, 3; 428/395, 284, 272, 245, 287, 492,
36, 520, 293, 493, 474, 292, 515, 517, 521, 302,
303; 156/110 A, 123 R, 308, 326, 327, 334, 335,
338, 137, 138, 139; 57/140 C, 164; 152/357 R,
359; 74/232

[56] References Cited

U.S. PATENT DOCUMENTS

| | | | |
|---|---|---|---|
| 3,746,669 | 7/1973 | Dunnom | 260/38 |
| 3,969,568 | 7/1976 | Sperley | 428/297 |

Primary Examiner—Stanley S. Silverman
Attorney, Agent, or Firm—Reuben Wolk

[57] ABSTRACT

An elastomeric endless power transmission belt is provided and has a tension section, a compression section, a load-carrying section, and may include one or more platform sections wherein at least one of the belt sections is made of a rubber matrix having a plurality of discrete aramid fibers embedded therein with the fibers having a comparatively high aspect ratio and being tenaciously bonded in position.

20 Claims, 6 Drawing Figures

ENDLESS POWER TRANSMISSION BELT

BACKGROUND OF THE INVENTION

It is known in the art to produce endless power transmission belts which employ discrete fibers embedded in an elastomeric matrix and as shown in U.S. Pat. Nos. 3,416,383, 3,657,938, and U.S. application Ser. No. 668,544, filed Mar. 19, 1976 for example. However, the fibers disclosed in these patents and application are not of optimum strength and thus do not provide a belt having the desired strength and/or flexibility.

It has also been suggested in U.S. Pat. No. 3,969,568 that aramid fibers are useful in the formation of tires, belts, hoses, etc. However, this latter patent teaches utilization of a comparatively expensive adhesive system to bond the aramid fibers in position which inherently increases the cost of the article made using same.

SUMMARY

It is a feature of this invention to provide an economical and reliable elastomeric endless power transmission belt.

Another feature of this invention is to provide a belt of the character mentioned which utilizes comparatively inexpensive fibers yet with such fibers providing optimum structural integrity for its belt without requiring special belt-making equipment, expensive adhesive systems, complicated processing, or the like.

Another feature of this invention is to provide an elastomeric endless power transmission belt for operation in an endless path which has a tension section, a compression section, a load-carrying section, and may have one or more platform sections wherein at least one of the sections is made of a rubber matrix having a plurality of discrete aramid fibers embedded therein with the fibers being tenaciously bonded in position employing a simple comparatively inexpensive bonding system and with each fiber having an aspect ratio ranging between 100 and 2,000 which helps provide the tenacious bond.

Another feature of this invention is to provide a belt of the character mentioned of trapezoidal cross-sectional configuration and having a load-carrying section which is located midway between the opposed inside and outside surfaces of the belt.

Accordingly, it is an object of this invention to provide an endless power transmission belt and method of making the same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
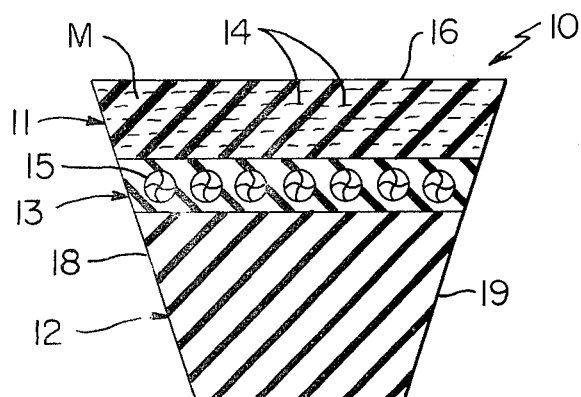
FIG. 1 is a cross-sectional view illustrating one exemplary embodiment of an endless power transmission belt of this invention having a tension section, a compression section, and a load-carrying section and having high strength fibers in its tension section.

Reference is now made to FIG. 1 of the drawing which illustrates one exemplary embodiment of an elastomeric endless power transmission belt of this invention which is particularly adapted for operation in an endless path and such belt is designated generally by the reference numeral 10. The belt 10 employs high strength fibers, to be subsequently described, which are substantially uniformly dispersed throughout selected locations or sections of the belt and each of such fibers has a high aspect ratio, i.e., the ratio of length to diameter is a large number, which provides a substantial surface area for each fiber enabling adhesion thereof in an associated elastomeric matrix of the belt body employing the adhesive system of this invention and as will be described in detail subsequently. The fibers are dispersed through each selected section or portion of the belt body in an elastomeric matrix which has what may be considered a high tear resistance.

The belt 10 comprises a tension section 11, a compression section 12, and a load-carrying section 13 with at least one of the sections, tension section 11 in this embodiment, being made of the previously mentioned high tear resistance elastomeric matrix preferably in the form of a rubber matrix M having a plurality of discrete fibers 14 embedded therein. The load-carrying section 13 of the belt 10 is comprised of a helically wound load-carrying cord 15 which is suitably embedded in an elastomeric cushion preferably in the form of neoprene gum, or the like. The belt 10 is of trapezoidal cross-sectional configuration defined by opposed parallel surfaces 16 and 17 opposed non-parallel surfaces 18 and 19 with the surfaces 16, 17, 18 and 19 being free of covers or so-called raw-edged. The fibers 14 are embedded in a rubber matrix M and are tenaciously bonded in position employing an adhesive bonding system comprised of 1 to 2.5 parts per hundred parts rubber (phr), by weight, resorcinol formaldehyde resin; 20 - 40 (phr) precipitated hydrated silica; and 2 - 6 (phr) melamine resin to thereby provide a tenacious bond and such bond is possible due to both the bonding system and the fibers having a maximum surface area for the weight and volume of such fibers and each fiber has an aspect ratio ranging between 100 and 2,000.

The fibers 14 are preferably of different random lengths ranging between roughly 1/16 of an inch to one inch for the majority of fibers with some fibers being less than 1/16 and other being as long as several inches. Each of the fibers 14 has a diameter generally of the order of 0.0005 inch. Accordingly, for fibers slightly less than 1/16 of an inch in length to 1 inch in length with a 0.0005 inch diameter such fibers would have the previously mentioned aspect ratios generally ranging between 100 and 2,000.

The fibers 14 are in the form of a floc and such fibers are aramid fibers. Aramid is a general fiber classification authorized by United States Federal Trade Commission for an organic fiber within the family of aromatic polyamides. An example of a commercially available aramid is sold under the registered trademark, "Kevlar" by the E. I. DuPont de Nemours and Company, Inc., of Wilmington, De.

The aramid fibers 14 may be dispersed throughout a particular section of the belt of this invention in amounts which may vary within a predetermined range. In particular, it has been found that from 5 to 50 parts by weight of aramid fibers for each 100 parts by weight of matrix may be uniformly dispersed within such matrix; and it will also be appreciated that the amount of fibers will vary depending upon which section of the belt such fibers are embedded in. For example, for optimum longitudinal flexibility the amount of fibers may be kept between 5 and 20 parts for each 100 parts by weight of matrix. However, for higher tensile strength and rigidity between 30 and 50 parts for each 100 parts by weight may be employed.

Other exemplary embodiments of the belt of this invention are illustrated in FIGS. 2, 3, 4, 5, and 6 of the drawing. The belts illustrated in FIGS. 2, 3, 4, 5, and 6 are very similar to the belt 10; therefore, such belts will be designated generally by the reference numerals 10A, 10B, 10C, 10D, and 10E respectively and parts of such belts which are similar to corresponding parts of the belt 10 will be designated by the same reference numeral as in the belt 10 also followed by the letter designation A, B, C, D, or E and not described again in detail. Only those component parts of certain ones of the belt 10A-10E which are substantially different from the corresponding parts of the belt 10 will be designated by a new reference numeral also followed by the associated letter designation and described in detail.

Figure 2:
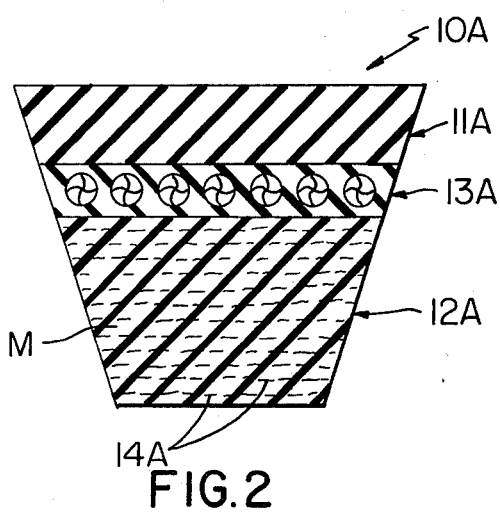
FIG. 2 is a view similar to FIG. 1 illustrating another exemplary embodiment of the belt of this invention and having high strength fibers in its compression section.

The belt 10A of FIG. 2 has a tension section 11A, a compression section 12A, and a load-carrying section 13A; and, the fibers 14A are provided in the compression section 12A.

Each of the belts 10 and 10A is provided with fibers 14 and 14A in its tension and compression sections 11 and 12A respectively. Preferably, each section 11 and 12A has between 5 and 20 parts of aramid fibers for each 100 parts by weight of rubber defining the associated matrix M and such fibers are disposed perpendicular the longitudinal axis of their associated belt whereby the belts 10 and 10A are readily flexed around comparatively small diameter pulleys.

Figure 3:
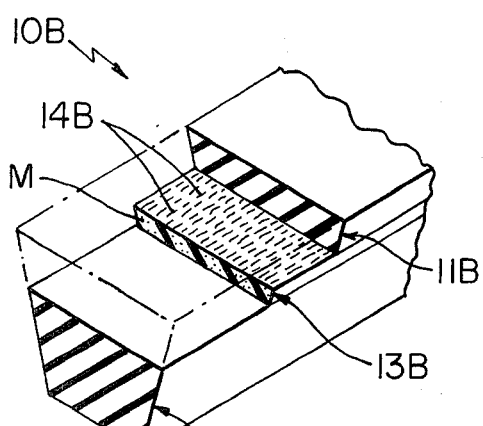
FIG. 3 is a fragmentary perspective view with parts in elevation and parts in cross-section illustrating another exemplary embodiment of the belt of this invention provided with high strength fibers in its load-carrying section.

The belt 10B of FIG. 3 has a tension section 11B and a compression section 12B both of which are free of fibers; however, the belt 10B has a load-carrying section 13B which is provided with a plurality of aramid fibers 14B embedded in its rubber matrix M in a random manner and with the elongated dimension of each fiber 14B being disposed parallel to the longitudinal axis or endless path of the belt 14B. Although any suitable amount of fibers 14B may be employed, preferably from 30 to 50 parts of fibers 14B for each 100 parts by weight of rubber are provided.

Figure 4:
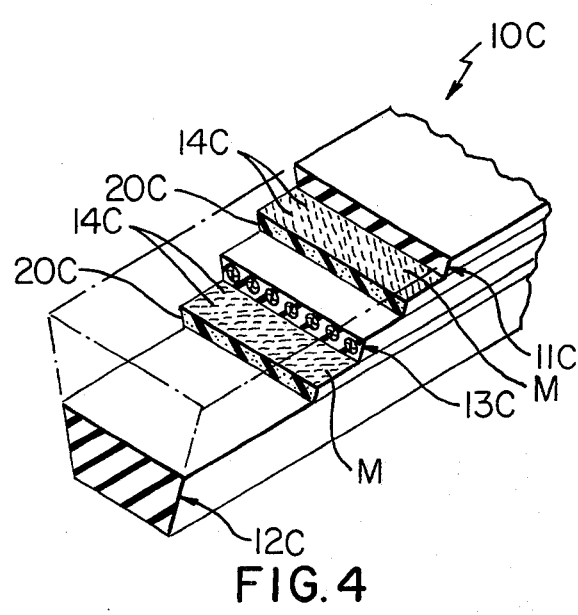
FIG. 4 is a view similar to FIG. 3 illustrating another exemplary embodiment of the belt of this invention which in addition to the tension, compression, and load-carrying sections has a pair of platform sections on opposite sides of the load-carrying section with each of the platform sections having high strength fibers embedded therein.

The belt 10C of FIG. 4 is comprised of a tension section 11C, a compression section 12C, a load-carrying section 13C, and a pair of platform sections designated by the same reference numeral 20C. Each platform section 20C has aramid fibers 14C dispersed therethrough in a random manner with from 30 to 50 parts of fibers 14B for each 100 parts by weight of rubber being provided in each section 20C.

The fibers 14C may be disposed in any desired manner relative to the longitudinal axis of the belt 10C including perpendicular to such axis, parallel to such axis, or at any intermedite angle. Preferably the fibers 14C in the platform section 20C which adjoins the compression section 12C are disposed in one sense or direction at an angle ranging between 45° and 80° to the longitudinal axis of the belt 10C, while the fibers 14C in the platform section 20C adjoining the tension section 11C are disposed at the same angle ranging between 25° and 80° with the longitudinal axis of the belt 10C but in an opposite sense or direction from the fibers 14C of the platform section 20C which adjoins the compression section.

Figure 5:
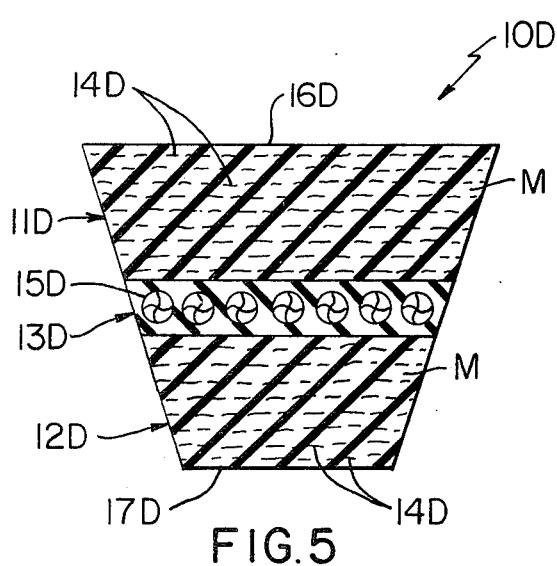
FIG. 5 is a cross-sectional view similar to FIG. 1 illustrating another exemplary embodiment of the belt of this invention which has a load-carrying section disposed midway between inside and outside surfaces thereof.

The trapezoidal belt 10D of FIG. 5 has a tension section 11D, a compression section 12D, and a load-carrying section 13D comprised of a helically wound load-carrying cord 15D disposed in an elastomeric gum layer. The load-carrying section 13D and thus cord 15D is arranged midway between the outside surface 16D and inside surface 17D of the belt 10D and inasmuch as such load-carrying section 13D is often referred to as a neutral axis the belt 10D, in essence, has what is popularly referred to as a central neutral axis. In the belt 10D each of the tension section 11D and the compression section 12D has fibers 14D dispersed therethrough and preferably from 5 to 20 parts of fibers per 100 parts of rubber matrix are provided in each of the sections 11D and 12D.

Figure 6:
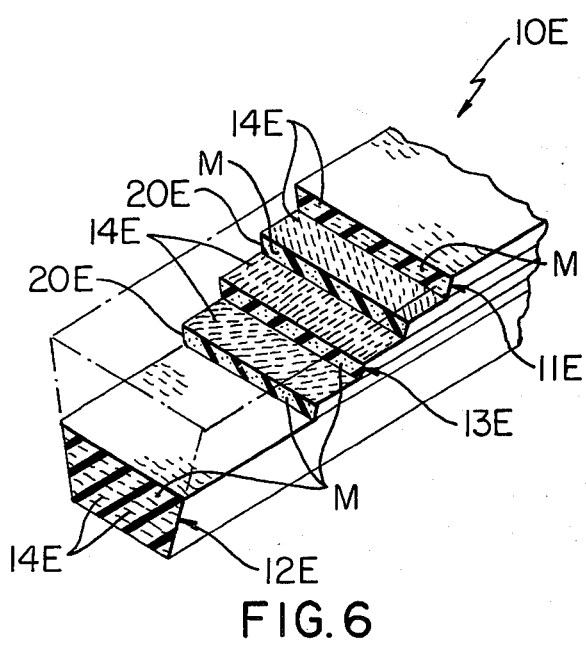
FIG. 6 is a view similar to FIG. 4 illustrating another exemplary embodiment of the belt of this invention which has high strength fibers embedded in various predetermined quantities in all of its sections.

The belt 10E of FIG. 6 is comprised of fibers 14E in all of its sections whereby fibers 14E are provided in the tension section 11E, compression section 12E, load-carrying section 13E, and platform sections 20E. Although any suitable amount of fibers may be employed in each of these various sections, from 5 to 20 parts of fibers 14E per 100 parts of rubber matrix M (stated 5-20 phr) by weight are provided in each of the sections 11E and 12E and 30-50 phr are provided in each of the sections 13E and 20E.

The fibers 14E in each of the tension and compression sections 11E and 12E respectively are disposed perpendicular to the longitudinal axis of the belt, the fibers 14E in the load-carrying section 13E are disposed parallel to the longitudinal axis of the belt, while the fibers in the platform sections 20E are disposed at opposed acute angles to the longitudinal axis of the belt 10E.

The parallel inside and outside surfaces and the nonparallel side surfaces of each belt disclosed herein are free of a cover or are raw-edged. However, it is to be understood that each of these belts may be covered as desired including about the entire belt periphery.

Each of the belts of this invention employs aramid fibers which are disposed in elastomeric matrix M described as being rubber. Preferably, neoprene rubber is employed, however, it is to be understood that other rubbers, such as nitrile rubber, stryene butadiene rubber, and the like may be employed, if desired.

The belt of this invention has optimum structural strength due to the provision of aramid fibers therein. To illustrate this point the following Table I presents results of tests made on various test sections of belts having different quantities of KEVLAR aramid fibers embedded in a neoprene rubber matrix M. The KEVLAR aramid fibers tested were of the sizes disclosed previously. Samples having from 10 to 40 phr of fibers were tested with the predominant elongated dimensions of the fibers in the test sample, i.e., with fibers, and across the predominant elongated dimensions of the fibers, i.e., across fibers.

The properties measured are indicated in Table I and hardness was measured on the Shore Durometer using the A scale. In addition the term modulus as used in this disclosure may be considered as resistance to deformation.

art. Further, the blending of fibers to obtain a uniform dispersal in their matrix may be achieved utilizing any suitable apparatus known in the art. Basically such blending is achieved utilizing the rubber matrix such as neoprene rubber and the aramid fibers are used employing additional adhesive means or bonding system of this invention. It has been found that in the belt of this invention high modulus and tensile strength are primarily the result of the five factors of good fiber dispersion in their matrix M; good physical adhesion and chemical bonding of fibers in matrix M employing the above-mentioned bonding system comprised of resorcinal formaldehyde resin, precipitated hydrated silica, and melamine resin; use of a high tear resistant elastomer

TABLE I

| | Amount of KEVLAR Aramid Fibers | | | | | | | |
|---|---|---|---|---|---|---|---|---|
| | 10 phr | | 20 phr | | 30 phr | | 40 phr | |
| Property Measured | with fibers | across fibers | with fibers | across fibers | with fibers | across fibers | with fibers | across fibers |
| Tensile strength, psi | 2465 | 1575 | 3125 | 1435 | 3765 | 1615 | 4135 | 1790 |
| Elongation,% | 31 | 371 | 21 | 120 | 14 | 71 | 12 | 58 |
| 10% modulus, psi | 1370 | 185 | 2090 | 270 | 3175 | 470 | 3850 | 600 |
| 20% modulus, psi | 2165 | 275 | 3110 | 435 | — | 720 | — | 930 |
| Hardness, Shore A | 90 | | 91 | | 94 | | 96 | |

A Table II is also presented and is a similar presentation which enables comparison of aramid fibers with wood cellulose fibers and polyester fibers with similar properties being determined. The wood cellulose fibers used were fibers manufactured by the Monsanto Company of St. Louis, Mo. and sold under the registered trademark of SANTOWEB. In one embodiment, these fibers had an elastic modulus of 2 to $5 \times 10^6$ psi and a tensile strength of 6 to $9 \times 10^4$ psi with an average diameter of 8 to 16 microns and a length of 1 to 3 millimeters. These wood cellulose fibers are further described in U.S. Pat. Nos. 3,836,412 and 3,709,845 and as disclosed in these two patents are suitably treated to promote bonding thereof in their elastomeric matrix. The polyester fibers presented in Table II may be of any suitable type known in the art and were of a diameter comparable to the KEVLAR aramid fibers and ¼ inch in length.

such as neoprene for the matrix; use of aramid fibers; and use of aramid fibers having a high aspect ratio which provides an optimum surface area for bonding in the elastomeric matrix.

It will also be appreciated that while specific ranges have been suggested for the components of the bonding system of this invention, the system preferably employs 1.7 phr resorcinal formaldehyde resin, 30 phr precipitated hydrated silica, 4 phr melamine resin.

The aramid-neoprene rubber composite employed in the belt of this invention provides tensile value of the order of 4,000 pounds per square inch when using 40 phr of aramid fibers.

While present exemplary embodiments of this invention, and methods of practicing the same, have been illustrated and described, it will be recognized that this invention may be otherwise variously embodied and practiced within the scope of the following claims.

TABLE II

| | Amount and Type of Fibers | | | | | | | |
|---|---|---|---|---|---|---|---|---|
| | 30 phr Santoweb D | | 40 phr Santoweb D | | 50 phr Santoweb D | | 20 phr Polyester | |
| Property Measured | with fibers | across fibers | with fibers | across fibers | with fibers | across fibers | with fibers | across fibers |
| Tensile strength psi | 1950 | 1350 | 2150 | 1338 | 2175 | 1310 | 2525 | 1120 |
| Elongation,% | 40 | 160 | 22 | 140 | 15 | 100 | 33 | 290 |
| 10% modulus, psi | 1295 | 200 | 1525 | 275 | 1900 | 300 | 1375 | 250 |
| 20% modulus, psi | 1740 | — | 2110 | 425 | — | 500 | 2075 | 340 |
| Hardness, Shore A | 90 | | 92 | | 92 | | 90 | |

It will be appreciated that other commonly used fibers, such as cotton, and the like, have poorer structural properties than those presented in Table II. The term modulus as used in this disclosure may be considered or defined as resistance to deformation.

Any suitable technique known in the art may be employed to define the belt of this invention and the aramid fibers may be disposed in their belt sections at any desired angle employing any technique known in the

What is claimed is:

1. An elastomeric endless power transmission belt for operation in an endless path comprising, a tension section, a compression section, and a load-carrying section, at least one of said sections being made of a rubber matrix having a plurality of discrete aramid fibers embedded therein, said fibers being tenaciously bonded in position employing an adhesive bonding system comprised of (1 - 2.5) phr resorcinol formaldehyde resin — (20 - 40) phr precipitated hydrated silica — (2 - 6) phr melamine resin, each of said fibers having an aspect ratio ranging between 100 and 2,000 which provides a substantial surface area and helps provide said tenacious bond.

2. A belt as set forth in claim 1 and further comprising a platform section on at least one side of said tension section.

3. A belt as set forth in claim 1 in which said one section is said tension section.

4. A belt as set forth in claim 1 in which said one section is said compression section.

5. A belt as set forth in claim 1 in which said one section is said load-carrying section.

6. A belt as set forth in claim 2 in which said one section is said platform section.

7. A belt as set forth in claim 6 in which said fibers of said one platform section are disposed at an acute angle to said endless belt.

8. A belt as set forth in claim 1 and further comprising a pair of platform sections disposed on opposite sides of said tension section and in which said one section is one of said platform sections, and further comprising a plurality of discrete aramid fibers embedded in said other platform section, said fibers in said other platform section also being tenaciously bonded in position and each having an aspect ratio ranging between 100 and 2,000.

9. A belt as set forth in claim 8 having a substantially trapezoidal cross-sectional configuration defined by an opposed pair of parallel surfaces and an opposed pair of non-parallel surfaces, said surfaces being free of covers.

10. A belt as set forth in claim 9 in which said load-carrying section is disposed midway between said parallel surfaces.

11. An elastomeric endless power transmission belt for operation in an endless path comprising, a tension section, a compression section, and a load-carrying section, at least one of said sections being made of a rubber matrix having a plurality of discrete aramid fibers embedded therein, said fibers being tenaciously bonded in position employing an adhesive bonding system comprised of (1 - 2.5) phr resorcinol formaldehyde resin — (20 - 40) phr precipitated hydrated silica — (2 - 6) phr melamine resin, each of said fibers having an aspect ratio ranging between 100 and 2,000 which provides a substantial surface area and helps provide said tenacious bond, said fibers in said one section comprising between 5 and 50 parts by weight of rubber matrix.

12. A belt as set forth in claim 11 and further comprising a platform section on at least one side of said tension section.

13. A belt as set forth in claim 11 in which said one section is said tension section and said fibers in said tension section comprise between 5 and 20 parts by weight for each 100 parts by weight of rubber matrix.

14. A belt as set forth in claim 11 in which said one section is said compression section and said fibers in said compression section comprise between 5 and 20 parts by weight for each 100 parts by weight of rubber matrix.

15. A belt as set forth in claim 11 in which said one section is said load-carrying section and said fibers in said load-carrying section comprise between 30 and 50 parts by weight for each 100 parts by weight of rubber matrix.

16. A belt as set forth in claim 12 in which said one section is said platform section and said fibers in said platform section comprise between 30 and 50 parts by weight for each 100 parts by weight of rubber matrix.

17. A belt as set forth in claim 11 in which said rubber matrix is neoprene rubber.

18. A belt as set forth in claim 11 in which said load-carrying section is comprised of a helically wound load-carrying cord.

19. A belt as set forth in claim 12 in which each of said sections is made of rubber matrix and aramid fibers identical to said one section.

20. A belt as set forth in claim 19 in which said belt has its entire exposed surface free of covers.

* * * * *